United States Patent [19]

Dieringer et al.

[11] Patent Number: 4,790,455
[45] Date of Patent: Dec. 13, 1988

[54] HOT MELT DISPENSING APPARATUS HAVING OFFSET HOPPER

[75] Inventors: Bruce G. Dieringer, Norcross; Kenneth E. Rothrauff, Suwanee, both of Ga.

[73] Assignee: Nordson Corporation, Westlake, Ohio

[21] Appl. No.: 928,962

[22] Filed: Nov. 10, 1986

[51] Int. Cl.$^4$ ............................................. A47G 19/12
[52] U.S. Cl. .................... 222/146.2; 222/199; 219/421; 126/343.5 R
[58] Field of Search ............... 222/146.5, 146.1, 146.2, 222/593, 200, 199, 547, 564; 198/752, 523; 219/421; 126/343.5

[56] References Cited

U.S. PATENT DOCUMENTS

| | | | |
|---|---|---|---|
| 2,907,498 | 10/1959 | Van Der Lely et al. | 222/200 |
| 3,091,368 | 5/1963 | Harley et al. | 222/200 |
| 3,266,670 | 8/1966 | Brooks et al. | 222/146.5 |
| 3,773,069 | 11/1973 | Rebentisch | 137/341 |
| 3,811,405 | 5/1974 | Baker et al. | 118/2 |
| 3,876,105 | 4/1975 | Kelling | 222/146.2 |
| 3,981,416 | 9/1976 | Scholl | 222/146.1 |
| 4,178,876 | 12/1979 | Nicklas et al. | 222/146.5 |
| 4,183,448 | 1/1980 | Nash | 222/146.5 |
| 4,453,867 | 6/1984 | Sharps | 366/98 |
| 4,456,151 | 6/1984 | Lewellen | 222/146.1 |
| 4,474,311 | 10/1984 | Petrecca | 222/146.2 |
| 4,501,382 | 2/1985 | Twayver | 222/199 |
| 4,545,504 | 10/1985 | Fabel et al. | 222/146.5 |

OTHER PUBLICATIONS

Brochure entitled "Syntron Vibra-Drives," FMC Instruction Manual for Feeders.

Primary Examiner—Michael S. Huppert
Assistant Examiner—Kenneth Noland
Attorney, Agent, or Firm—Wood, Herron & Evans

[57] ABSTRACT

A hot melt dispensing apparatus for converting solid thermoplastic material to molten thermoplastic material and for dispensing the molten thermoplastic material comprises a solid thermoplastic material receiving hopper, a vibrated feed chute mounted beneath a bottom opening in said hopper, which vibrated feed chute has a discharge opening laterally offset from the vertical plane of the hopper, and a heated reservoir mounted beneath the discharge end of the feed chute. The reservoir is laterally offset from the hopper so that heat rising from the reservoir does not melt solid thermoplastic material contained within the hopper or within the feed chute. The hopper is rectangular in configuration and comprises three vertical walls and one sloping wall angled relative to a bottom discharge opening of the hopper.

4 Claims, 2 Drawing Sheets

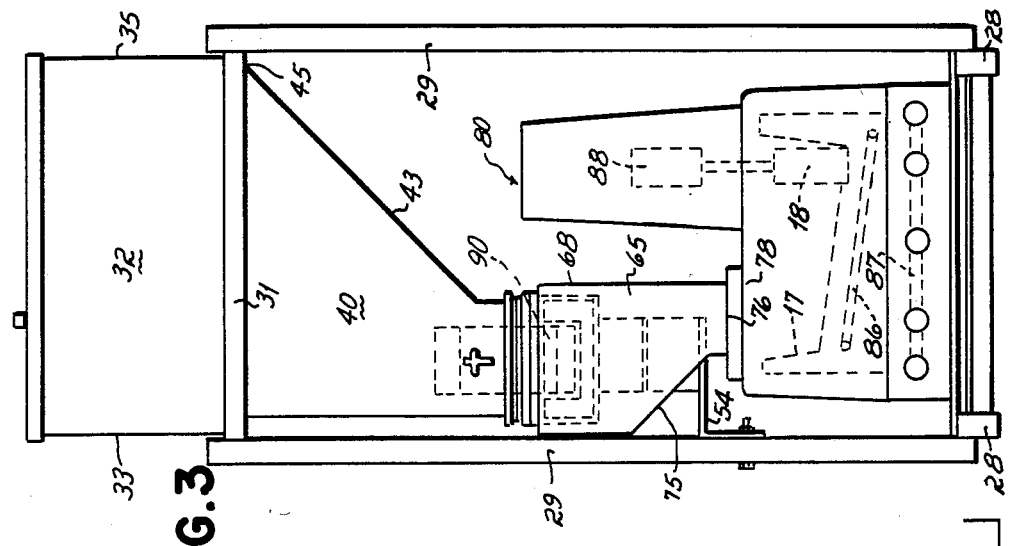
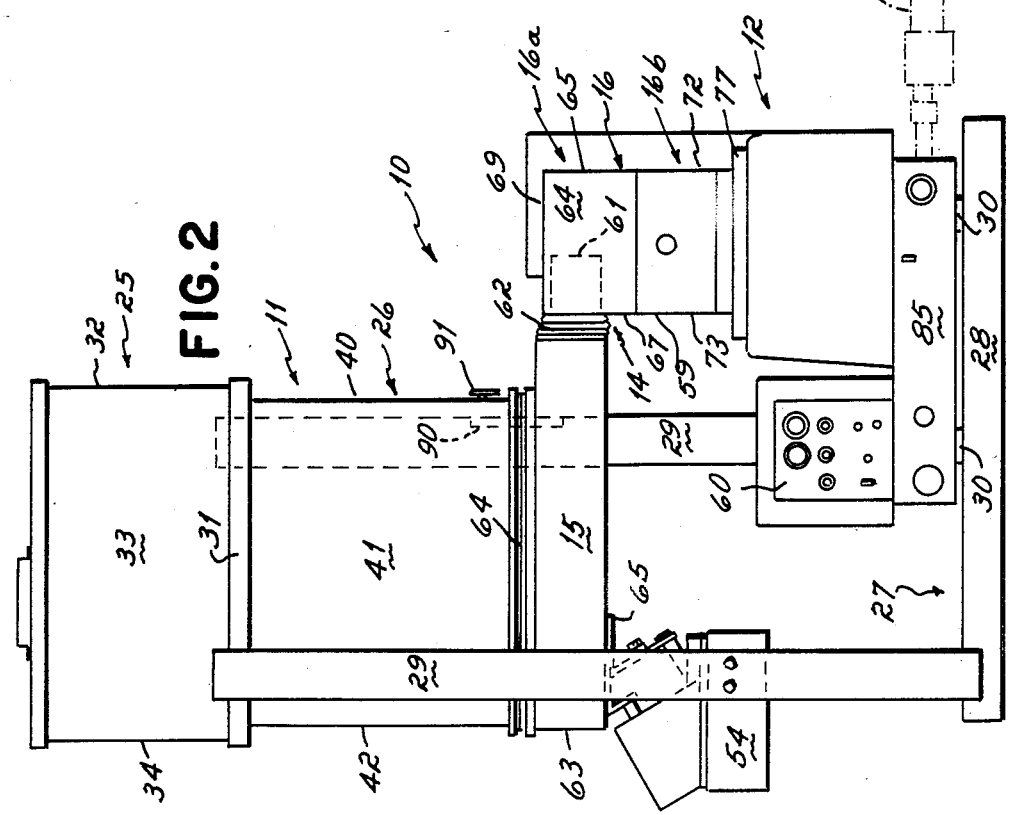

HOT MELT DISPENSING APPARATUS HAVING OFFSET HOPPER

This invention relates to apparatus for melting and dispensing solid thermoplastic material.

Thermoplastic materials, or so-called "hot melt" materials are conventionally stored and maintained in a solid state. When the material is to be used, it is melted and converted from a solid to a molten state in a tank having heated walls. The melted material is then maintained in the molten state in the tank in sufficient volume to supply one or more applicators or dispensers. If the job or application requires a substantial volume of hot melt material, a sufficiently large volume of material is maintained in the molten or melted state to meet that demand.

A characteristic of most thermoplastic materials is that they oxidize, char, or degrade when exposed to heat in the molten state over a prolonged length of time and/or when exposed to oxygen in the molten state for any appreciable length of time. Consequently, it has always been desirable to minimize the time that an applicator system maintains the melted material in the molten state. This minimal duration molten state of the thermoplastic material is accomplished by balancing or matching the melt rate of the system with the application rate of the dispenser.

There are many applications for hot melt material wherein there is a relatively low through-put of molten material, but a large volume of material is required to be maintained in a reservoir of solid material. Such applications usually occur on highly automated production lines wherein there may be a need for an eight-hour supply of material which will be used at a relatively slow rate. In that event, the reservoir must be large, and the melting tank must be relatively small.

A problem which commonly occurs whenever a large volume of solid state hot melt material is maintained in a hopper for supply to a relatively low through-put tank or melter is that over a prolonged period of time, the heat of the melter tends to flow back into the solid material, and that heat eventually causes the solid material stored in the hopper to melt and cause feed problems between the hopper and the melting tank. When the solid material in the hopper does inadvertently become melted, it causes subsequent feed problems, but those problems are multiplied many fold if the apparatus is then turned off or shut down with molten material contained in the hopper. That molten material in the hopper than solidifies and is difficult to remelt, with the result that the solid portion of the remelt may form a "bridge" across the walls of the hopper and completely block infeed of solid stock from the hopper into the melter.

In addition to the problem of remelting the solid material contained within the hopper, the bridge formed by a solid block of material in the bottom of the hopper can act as a pressure cap adhered to the side walls of the hopper. In the case of some molten thermoplastic adhesives, as for example, pressure sensitive adhesives which have a high rate of thermal expansion, that pressure cap often results in the sufficiently high pressure buildup in the molten material to cause the apparatus to spring a leak at the sealed joints between the hopper and the melting tank.

In an effort to solve the hopper melt-back problems described hereinabove, there is described in Scholl U.S. Pat. No. 3,981,416 a system wherein an air flow shroud is located around the hopper and an air flow is maintained through the shroud so as to cool the hopper and prevent melt back or melting of material within the hopper. Yet another attempted solution at this same problem is described in Petrecca U.S. Pat. No. 4,474,311. In this latter patent, the walls of the hopper are disclosed as being coated with "Teflon" so as to prevent molten material contained within the hopper from adhering to the walls of the hopper and forming a bridging pressure cap. While both of these patents address the problem of avoiding a pressure maintaining cap within the hopper, neither addresses or satisfactorily solves the problem of heat from the melter or tank backing into the hopper and melting that material, which, when it subsequently solidifies and becomes necesssary to remelt, requires an overly long warm up period.

It has therefore been an objective of this invention to provide an improved hot melt dispensing apparatus wherein there is no tendency for the heat from a melter tank to melt solid thermoplastic material contained in a hopper positioned so as to feed that solid thermoplastic material into that tank or melter.

Still another objective of this invention has been to provide a relatively inexpensive and cost effective system for feeding solid thermoplastic material from a large bank of solid thermoplastic material to a melter tank, which large bank of solid material is not subject to heat from the melter causing solid thermoplastic material contained within the bank to melt and jam the feed to the melter.

Still another problem associated with the feed of hot melt material from a hopper into a melting tank is caused by solid chunks or blocks of material forming a mechanical bridge to jam the outlet of the hopper. Typically, hoppers have multiple sloping walls tapering down from a storage reservoir to a discharge outlet. Some forms of solid hot melt materials are particularly prone to jam the hopper outlet. Examples of such jam-prone forms or shapes are commonly identified as "pillows" or "slats" or "chicklets." "Slats" are small blocks or solid thermoplastic material which typically measure 1½ inch by 1½ inch by ⅛ inch, while "pillows" typically measure 1½ inch by 1½ inch by ½ inch, and "chicklets" typically measure ½ inch by ½ inch by ⅛ inch. These forms of solid bulk material can be extremely difficult to feed through tapering wall hoppers without having the materials mechanically bridge and jam the hopper outlet.

It has therefore been another objective of this invention to provide an improved feed hopper which is not subject to jamming or blockage, even when feeding difficult-to-feed block form materials.

These objectives are achieved, and one aspect of this invention is predicated upon, the concept of mounting a feed hopper above but laterally offset from a melter tank and then utilizing a vibrated feed chute for feeding material from the hopper to the tank. It has been found that this orientation and feed system have the advantage of enabling the solid thermoplastic material to be fed into the tank at a very slow rate from a very large capacity hopper without any tendency for the heat from the tank to cause melting of the solid thermoplastic material in either the hopper or the feed chute.

Yet another aspect of this invention is predicated upon an improved configuration of a feed hopper. Specifically, the invention of this application utilizes a hopper which has three vertical walls and one sloping wall feeding into a bottom discharge outlet from the hopper. This configuration of the hopper has been found to minimize mechanical bridging or jamming of the discharge outlet of the hopper, even when very difficult-to-feed configurations of bulk form "hot melt" materials are fed through the hopper to a melting tank.

These and other objects and avantages of this invention will be more readily apparent from the following description of the drawings in which:

FIG. 2 is a side elevational view of the apparatus of FIG. 1, but with the addition of a hot melt dispenser shown in phantom in this figure.

FIG. 3 is a front elevational view of the apparatus of FIG. 1.

Figure 1:
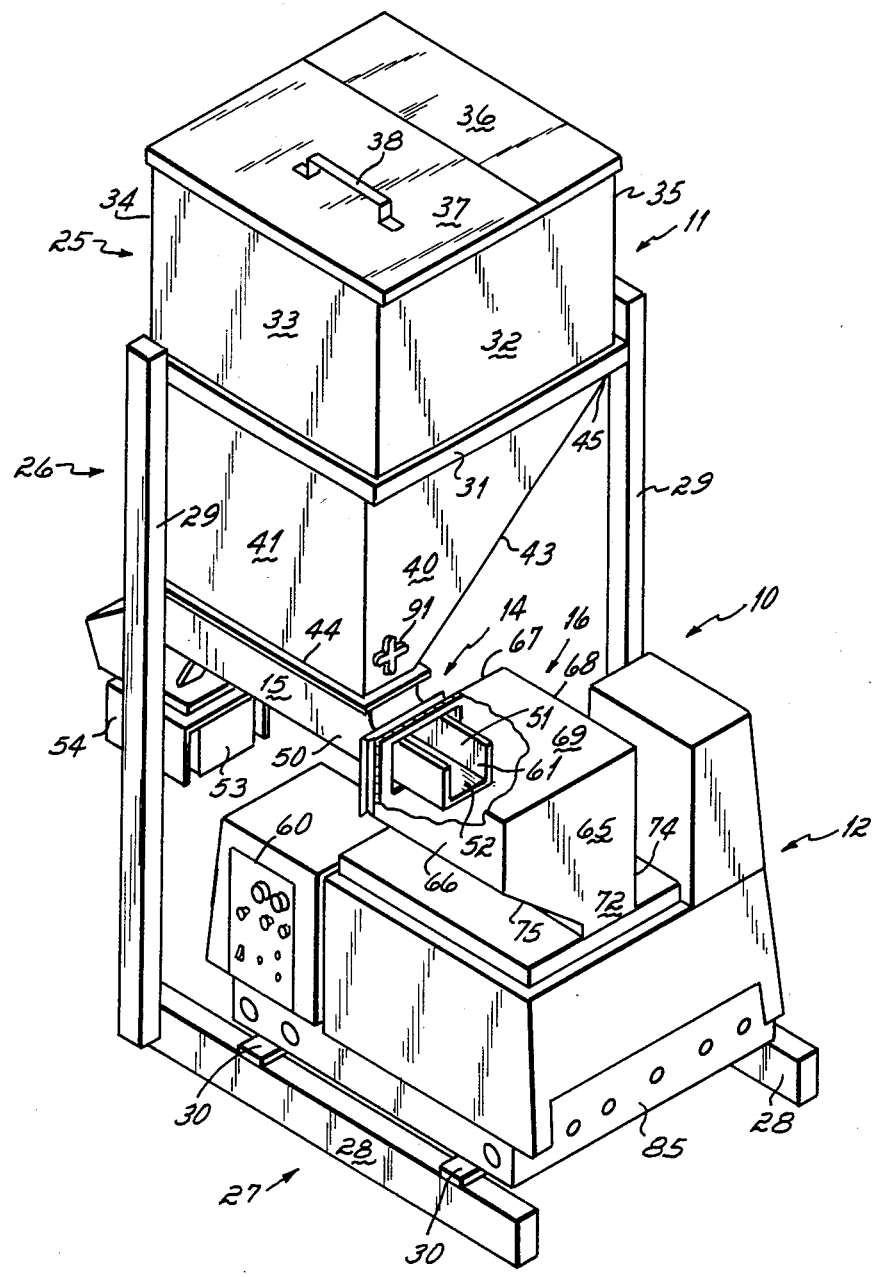
FIG. 1 is a perspective view, partially broken away, of a hot melt dispensing system and hopper for feeding that system incorporating the invention of this application.

With reference to the drawings, there is illustrated a dispensing system 10 for dispensing molton thermoplastic material or so-called "hot melt" material onto a substrate 9 (FIG. 2). This system 10 comprises a hopper 11 for storing solid thermoplastic material and feeding it into a hot melt applicator 12. The applicator is operative to melt the hot melt material and pump it to a dispenser 13. It comprises a melter tank 17 for converting the solid thermoplastic material into molten material and a pump 18 for pumping that molten material from the heated tank 17 via a conventional heated hose 19 to the dispenser 13. Additionally, the system includes a feeder 14 for transporting the solid thermoplastic or hot melt material from the hopper into the hot melt applicator 12. In the preferred embodiment, the feeder comprises a vibrated feeder chute 15 and a feeder hood 16 located over the hot melt applicator 12.

Hopper

The solid material storage hopper 11 comprises an upper portion 25 and a lower portion 26. Both portions of the hopper 11 are mounted upon and supported from a frame 27. This frame comprises a pair of horizontal base support bars 28 and a pair of vertically extending posts 29 welded or otherwise fixed at the bottom to the horizontal bars 28. Extending between the horizontal bars 28 are a pair of cross bars 30 upon which the hot melt applicator 12 is mounted.

At the upper ends of the vertical posts 29 there is a rectangular frame 31 upon which both the upper and lower portions of the hopper 11 are mounted. This rectangular frame 31 is welded or otherwise fixedly secured to the vertical posts 29.

The upper portion 25 of the hopper 11 is rectangular and comprises four side walls 32, 33, 34 and 35, each one of which is located in a vertical plane. Mounted atop these four side walls is a top wall 36 which partially covers the top of the hopper. A lid 37 is hingedly connected to the top 36 and has a handle 38 thereon. This handle enables the lid to be lifted so as to facilitate loading of solid thermoplastic material into the hopper through the open lid.

The lower portion 26 of the hopper 11 is suspended from the rectangular frame 31. It comprises three vertical walls 40, 41, 42, each one of which is generally co-extensive and co-planar with the vertical walls 32, 33 and 34, respectively, of the upper portion of the hopper. The lower portion 26 of the hopper also includes a fourth wall 43 which slopes upwardly and outwardly from the open bottom 44 of the lower portion of the hopper. The upper edge 45 of the sloping wall 43 terminates beneath the vertical wall 35 of the upper portion of the hopper. The bottom of the upper portion 25 of the hopper 11 is open, as is the top of the lower portion 26 of the hopper so that solid thermoplastic material supplied through the lid 37 into the upper portion of the hopper flows downwardly through both the upper and lower portions of the hopper into and through the open bottom 44 of the lower portion.

Feeder

The chute 15 is generally U-shaped in cross section and comprises a pair of vertical side walls 50, 51 and a bottom wall 52. It is open at the top to the open bottom 44 of the hopper and is so positioned that material falling from the hopper falls into the open top of the chute.

The chute 15 is supported from a vibrator 53, which is in turn mounted upon a vibrator support 54. The vibrator support 54 is in turn mounted upon one of the vertical posts 29 of the frame. The connection is such that the vibrator 53 effects vibration of a horizontal chute mounting plate 55. That vibratory motion is transmitted from the plate 55 to the chute 15. The vibratory movement, though, is isolated from the vibrator support 54 and the vertical post 29 of the frame as a consequence of the construction of the vibrator and vibrator motor. The vibrator 53 is a conventional vibratory feeder of the type conventionally used to apply directional vibratory movement of parts along tracks or troughs. One such commercially available vibratory feeder suitable for this application is a "Syntron Vibra-Drive," Model F-010, manufactured by FMC Corporation, Material Handling Equipment Division in Homer City, Pa. Other vibratory drives could as well, though, be used as part of this vibratory feeder 14.

It will be appreciated that when the motor of the vibrator 53 is electrically actuated from an electrical control panel 60 or from an automatic level control (not shown) contained within the melter tank 17, the chute 15 will be caused to vibrate at a selected rate and in a predetermined direction so as to effect movement of solid thermoplastic material through the chute and through the open discharge end 61 thereof.

In order to maintain the open top of the chute 15 dust free, the upper edges of the side walls 50, 51 and rear wall 63 of the chute are connected by a bellows seal 64 to the bottom edge of the lower portion of the hopper 26. Similarly, the side and bottom walls of the chute are surrounded by and attached to a rear wall 67 of the hood 16 by a bellows seal 62.

The hood 16 fits over and encloses the otherwise open top of the melter tank 17. As may be seen most clearly in FIG. 1, the hood 16 is configured or shaped very similarly to the hopper 11. That is, it comprises a rectangular upper portion 16a having four vertical side walls 65, 66, 67 and 68, as well as a closed top 69. It also has a lower portion 16b which has three side walls 72, 73, and 74 co-planar and co-extensive with the vertical side walls 65, 67, and 68, respectively, of the upper portion. Additionally, it has a sloping wall 75 which slopes downwardly and inwardly from the side wall 66 of the upper portion to the open bottom 76 of the hood. This open bottom 76 is connected to a lid 77 which fits over an opening 78 of the housing 80 of the hot melt applicator 12. In the preferred embodiment of the hood, it has a viewing window (not shown) in the top wall 69 through which the level of molten material in the tank 17 may be observed.

Applicator

The applicator 12 is conventional and per se forms no part of the invention of this application. One applicator suitable for use in the practice of this invention is completely described in Lewellen U.S. Pat. No. 4,456,151. Other applicators also useful in the practice of this invention are completely described in Scholl U.S. Pat. No. 3,981,416 and Petrecca U.S. Pat. No. 4,474,311.

The preferred applicator 12 utilized in the practice of this invention comprises the melter tank 17 mounted upon a manifold block 85. This manifold block is bored such that molten material melted in the tank by electrical resistance heaters 86 contained in the wall of the tank may be pumped by the pump 18 through the bores 87 and porting of the manifold block 85 to one or more hoses 19 operative to then transport the molten material to one or more dispensers 13. The pump 18 is driven by a motor 88 mounted within the housing 80 which completely encloses the applicator 12.

In use, the dispensing system 10 is charged with molten thermoplastic material placed into the hopper 11 through the lid 37. That charge of material, which may be in the form of blocks, chunks, pillows, chicklets or slats, pellets or granules, falls by gravity through the hopper into the open top of the chute 15. When a switch contained in an electrical control panel 60 on the side of the machine is actuated or when an automatic level control (not shown) contained within the melter tank 17 signals a low level of molten material within the tank 17, the vibrator 53 is electrically actuated so as to effect vibration of the chute. That vibratory motion in turn feeds the solid thermoplastic material along the chute 15 and through the open end thereof into the interior of the hood 16. In the preferred embodiment of the invention, there is an adjustable gate 90 mounted on the inside wall 40 of the hopper 11. The lower end of that gate extends downwardly into the chute and controls the rate at which vibratory movement of the chute 15 effects feeding motion of solid thermoplastic material through the open end 61 of the chute. The height of the bottom of that gate within the chute is controlled by a handle or knob 91 mounted on the front wall 40 of the hopper. That knob is attached to a screw which extends through a vertical slot in the front wall 40 of the hopper and into threaded engagement with a threaded bore of the gate.

Material falling from the open end 61 of the chute 15 falls into the hood 16. That material then falls by gravity through the open bottom of the hood into the open top of the melter tank 17. The electrical resistance heater 86 in the bottom of the tank then is operative to melt that solid thermoplastic material and convert it from the solid to the molten state. The molten thermoplastic material is then pumped by the pump 18 through the manifold block 85 to the heated hoses or conduits 19, which in turn supply the molten material to the dispenser 13.

It has been found that by mounting the applicator 12 with its heated melter tank 17 in a vertically offset position relative to the hopper through which solid material is fed into the tank, and that by interconnecting the bottom of the hopper with the infeed to the melter tank through a horizontally oriented, vibrated feeder chute, the problem of material melting within the feeder chute or the hopper is completely eliminated. Even when the hood 16 completely encloses the end of the chute and is unvented, there is generally no tendency for the chute to become so hot as to melt the thermoplastic material and impede the flow of solid thermoplastic material through the chute. In those occasional instances where the thermoplastic material may become soft and tacky with the chute, as for example, when feeding certain relatively low melting temperature adhesives through the chute, the problem of that soft and tacky material impeding the flow of material through the chute has been avoided by coating the inner surface of the side walls 50, 51 and bottom wall 52 of the chute 15 with a non-stick coating, such as fluorinated ethylene propylene ("Teflon"). When the chute is vibrated, this non-stick coating completely eliminates any tendency for soft, tacky thermoplastic material or adhesive to stick to the walls of the chute.

It has also been found that the illustrated configuration of the hopper, as well as the hood, wherein there are three vertical side walls on the hopper or hood and one sloping wall, enhances the ability of the chute of the hopper to feed numerous different configurations of solid thermoplastic material into the feeder tank without the hopper becoming mechanically jammed or bridged by those difficult-to-feed configurations.

While I have described only a single preferred embodiment of my invention, persons skilled in the art to which this invention pertains will appreciate numerous changes and modifications which may be made without departing from the spirit of my invention. Therefore, I do not intend to be limited except by the scope of the following appended claims.

I claim:

1. An apparatus for converting solid thermoplastic material to molten thermoplastic material and for dispensing the molten thermoplastic material, said apparatus comprising a solid thermoplastic material receiving hopper having side walls and a bottom opening, a feed chute mounted beneath said opening in said hopper, said chute having an open upper end for receiving solid material from the bottom opening of said hopper, said chute having a discharge end opening laterally offset from the vertical plane of said hopper, means for vibrating said chute so as to effect movement of solid thermoplastic material along said chute and out of said discharge end opening of said chute, a reservoir mounted beneath said discharge end opening of said chute, said reservoir being open at the top for receiving solid thermoplastic material from said discharge end opening of said chute, means for heating said reservoir so as to convert said solid thermoplastic from a solid to a molten state, said hopper being laterally offset from said heated reservoir so as to prevent heat from said reservoir from melting solid thermoplastic material contained within said hopper, and said discharge end of said chute being enclosed within a hood, which hood has a bottom open to the open top of said reservoir.

2. The apparatus of claim 1 wherein said hood has four side walls, three of said four side walls of said hood being located in vertical planes and said fourth side wall sloping upwardly and outwardly away from said bottom of said hood.

3. An apparatus for converting solid thermoplastic material to molten thermoplastic material and for dispensing the molten thermoplastic material, said apparatus comprising a solid thermoplastic material receiving hopper having side walls and a bottom opening, a reservoir mounted below said hopper, said reservoir having an open top and including heating means for heating solid thermoplastic material contained within said reservoir and for converting that solid thermoplastic to molten thermoplastic material, the improvement comprising said reservoir being laterally offset from said bottom opening of said hopper so as to prevent heat from said reservoir from melting solid thermoplastic material contained within said hopper, a feed chute mounted beneath said discharge opening of said hopper, said feed chute having an open top for receiving solid thermoplastic material from said hopper bottom opening, and said feed chute having a discharge end opening located over the open top of said reservoir, and said discharge end of said chute being enclosed within a hood, which hood has a bottom open to the open top of said reservoir.

4. The apparatus of claim 3 wherein said hood has four side walls, three of said four side walls of said hood being located in vertical planes and said fourth side wall sloping upwardly and outwardly away from said bottom of said hood.

* * * * *